Dec. 4, 1962 V. B. KWAST 3,067,376

FREQUENCY TRANSDUCER

Filed Dec. 18, 1959

VICTOR B. KWAST
INVENTOR.

BY Rudolph J. Juick
ATTORNEY 3,067,376
Patented Dec. 4, 1962

1

3,067,376

FREQUENCY TRANSDUCER

Victor B. Kwast, Union, N.J., assignor, by mesne assignments, to Daystrom Incorporated, Murray Hill, N.J., a corporation of Texas Filed Dec. 18, 1959, Ser. No. 860,483
8 Claims. (Cl. 321—16)

This invention relates to a frequency sensitive electrical system responsive to the frequency of an input signal, which system is adapted for use as a frequency meter, a frequency sensitive tachometer, a frequency modulator detector (discriminator), or the like.

The frequency sensitive electrical network of my invention has many advantages over prior art frequency responsive arrangements. The arrangement has the utmost sensitivity and high resolution. It utilizes stable, solid state, elements and is very economical to produce. In addition, it operates well even at low frequencies, and over a wide ambient temperature range.

An object of this invention is the provision of a frequency transducer having an output circuit which simultaneously carries a constant amplitude unidirectional biasing current of one polarity and a unidirectional signal current of opposite polarity which signal varies in accordance with the input signal frequency, the said signal current and biasing current both having a frequency twice the frequency of the input signal to the transducer.

An object of this invention is the provision of a novel frequency sensitive circuit comprising a saturable core transformer having a center-tapped secondary winding through which transformer an input signal is fed through a pair of parallel conducting paths to an output circuit, the output from the said conducting paths comprising unidirectional current of opposite polarity, the output from one conducting path being substantially constant while the output from the other conducting path varies in accordance with the frequency of the input signal, the said outputs flowing simultaneously in the said output circuit.

An object of this invention is the provision of a frequency transducer which includes a copper wire temperature compensating resistor therein for simply and easily compensating for temperature changes thereof.

An object of this invention is the provision of a rugged, efficient, temperature independent frequency transducer which is easily manufactured at low cost.

These and other objects and advantages will become apparent from the following description when taken with the accompanying drawings, which drawings are for purposes of illustration and are not to be construed as defining the scope of limits of the invention, reference being had for the latter purpose to the appended claims.

In the drawings wherein like reference characters denote like parts in the several views.

Figure 1:
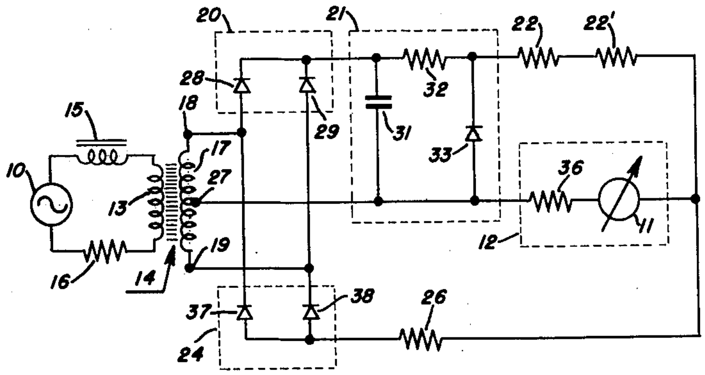
FIGURE 1 is a schematic circuit diagram of my novel frequency transducer shown connected to an input source, the frequency of which source is to be measured.

Reference is first made to FIGURE 1 of the drawings

2 wherein the reference numeral 10 designates an input signal source, the frequency of which source is to be measured by the frequency transducer circuit of my invention. The source 10 may comprise a nominal 60 cycle, 110 volt power source, for example. The frequency transducer produces a D.-C. output current which can be measured on a D.-C. instrument 11 suitably calibrated in terms of frequency, or the like. If the circuit is to be used in tachometry, the source 10 may comprise an A.-C. tachometer generator, and the instrument 11 may be calibrated in terms of revolutions per minute, or the like. In any event, the output current in the output circuit 12 of the transducer is a function of the input frequency; the transducer being suitable for any desired use.

The input signal from the source 10 is connected to the primary winding 13 of a saturable core transformer 14 through a series connected choke 15, which serves to limit the current in the transformer primary winding, and a resistor 16. The transformer 14 is preferably of the closed ring, ribbon-wound, toroidal type with primary and secondary windings. The ribbon-wound transformer core is of a material having a generally rectangular B–H loop and a coercivity that is small. The core saturates at a low flux density.

The current from the end terminals of the center-tapped secondary winding 17 of the saturable core transformer is fed through a biasing, or reference, current circuit and a signal current circuit to the output circuit 12 where the said currents combine. The reference current circuit from the secondary winding 17 includes a rectifying diode network 20, a regulator network 21, a first, or reference current controlling, resistor element 22 and a copper, wire wound, temperature compensating resistor 22', while the signal current path from the secondary winding 17 includes a rectifying diode network 24 and a second, or signal current, resistor element 26. Currents from both of the reference current and signal current circuits simultaneously flow through the output circuit 12.

The diode, or rectifier, network 20 in the biasing current circuit includes a pair of diodes, or rectifier elements, 28 and 29 which, for ruggedness and reliability, are preferably of the semi-conductor type, such as silicon rectifiers, although they may be of the vacuum tube type. The diode anodes are connected to the individual terminals 18 and 19 of the secondary winding 17 while the cathodes thereof are connected together and to the input of the voltage regulator network 21. The voltage regulator network may comprise, for example, a filter network comprising a shunt connected capacitor 31 and series connected resistor 32, together with a shunt-connected diode 33. The diode 33 is of the type which exhibits a Zener voltage characteristic when subjected to a reverse potential of sufficient magnitude. The diode has a high inverse voltage characteristic up to the Zener voltage, but above the Zener voltage, the impedance is small and substantially constant. Such diodes are commonly made of silicon. The polarity of the D.-C. pulses from the biasing current diode network rectifiers 28 and 29 is such that the diode 33 is connected in a reverse-potential manner, that is, with the cathode thereof connected to the cathodes of the rectifiers 28 and 29. With a sufficiently large input to the regulator network, the diode 33 operates within the Zener region whereby the output voltage from the regulator network is stable over a range of input voltages to the said network.

The stable regulator output voltage is applied to the said reference current controlling resistor 22 and temperature compensating resistor 22′, with the current therethrough returning to the transformer secondary winding center tap 27 through the output circuit 12. The output circuit may comprise the series connected D.-C. instrument 11 and a resistor 36; the meter 11 providing a visual indication of the frequency of the input signal to the transducer.

The diode network 24 in the signal current circuit includes also a pair of diodes, or rectifiers, designated 37 and 38, which may be of the same type as the diodes 28 and 29 in the biasing current circuit. The diodes 37 and 38 have their cathodes connected to the individual terminals 18 and 19 of the transformer secondary winding 17, while the anodes thereof are connected together and to the resistor 26. It will be apparent that the connections to all of the diodes, including the Zener diode, in the transducer could be reversed, if desired, since the polarities thereof are relative. The current through the resistor 26 from the diode network 24, which varies in accordance with the frequency of the input source 10, in a manner described in detail below, is conducted through the output circuit 12 simultaneously with the biasing current through the resistors 22 and 22′. The unidirectional biasing current opposes the unidirectional signal current in the output circuit 12 since the diodes 28 and 29 are connected in a reverse sense with respect to the connections to the diodes 37 and 38. The meter 11 in the output circuit, therefore, indicates the difference in the said signal current and biasing current.

It will be understood that during normal operation, the core of the transformer 14 saturates during each one-half cycle of input current thereto from the signal source 10. Therefore, as is well understood by those skilled in this art, the number of coulombs, per pulse, delivered from the secondary winding 17 is a fixed and stable quantity. The average value of the current pulses in the secondary winding 17 is, therefore, proportional to the frequency of the voltage at the primary winding 13. Thus, the rectified output pulses from the second rectifying diode network 24, which also obviously vary in frequency in accordance with the frequency of the source 10, are directly proportional in magnitude to the frequency of source 10. (The saturable core transformer is also responsive to changes in the voltage input to a small degree, and for this reason, it is desired to operate the transducer from a constant voltage source 10. Output effects due to changes in the voltage of the source 10 may be minimized, however, by the proper choice, or selection, of the various elements comprising the novel transducer circuit.) As mentioned above, the voltage from the transformer secondary winding 17 through the first rectifying diode network 20 to the regulator network 21 is sufficiently large, during normal operation, to permit operation of the diode 33 in the Zener region. Thus, the voltage at the regulator network output is substantially constant, even in the face of voltage changes thereto from the secondary winding.

Figure 2:
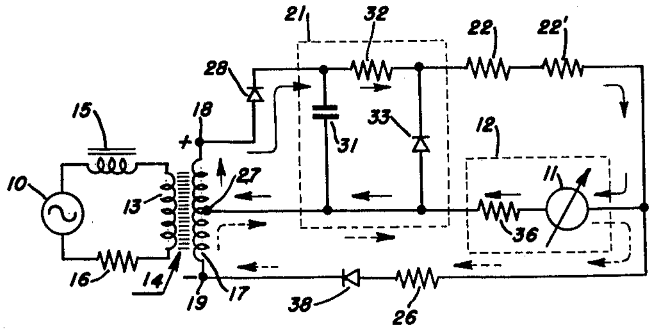
FIGURE 2 is a schematic circuit diagram of only the conducting elements included in the circuit at one instant of the operating cycle.
Figure 3:
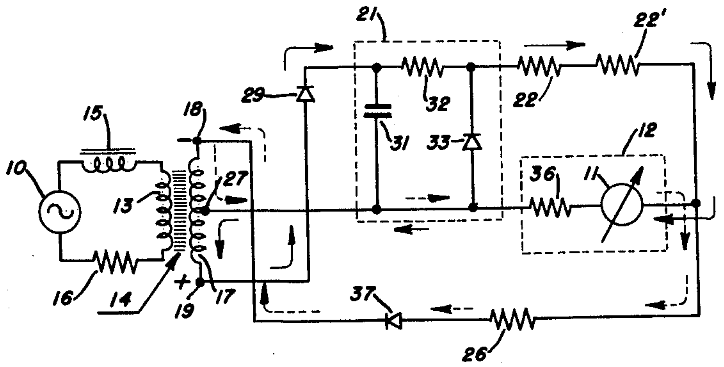
FIGURE 3 is a schematic circuit diagram of only the conducting elements at a second instant of the operating cycle when the input signal source is of opposite polarity.

The operation of the frequency transducer will best be understood from an examination and explanation of FIGURES 2 and 3 of the drawings wherein the current conducting elements of the circuit during alternate one-half cycles of operation are shown. Reference is first made to FIGURE 2, wherein the diodes 29 and 37, which are non-conducting at the illustrated instant of the operating cycle, have been omitted from the circuit diagram. In FIGURE 2, the biasing current through the diode 28 is designated by the solid lines and arrows, while the signal current through the diode 38 is designated by the broken lines and arrows. The signal current flows from the center tap on the transformer secondary winding, through the output resistor 36 and meter 11, the resistor 26, and thence to the transformer secondary winding terminal 19. At the same time, simultaneously therewith, a biasing current flows from the terminal 18 of the transformer secondary winding 17 through the diode 28, regulator network 21, resistors 22 and 22′, and thence through the meter 11 and output resistor 36 to the center tap on the secondary winding. The magnitude of the signal pulses will depend upon the frequency of the signal source 10. The Zener diode 33 in the regulator network, on the other hand, maintains a substantially constant, fixed stable voltage between the Zener diode electrodes whereby the biasing current through the resistors 22 and 22′, meter 11 and load resistor 36 remains substantially constant. Since the currents flow in opposite directions through the meter 11, the meter responds to the difference of such current pulses. Referring now, to FIGURE 3, one-half cycle later in the operation, the diodes 29 and 37 are shown conducting; the nonconducting diodes 28 and 38 not being shown in FIGURE 3. The signal current pulses (the broken lines and arrows) may be traced from the center tap 27 on the transformer secondary winding 17, through the load resistor 36 and meter 11 and thence to the terminal 18 in the transformer secondary winding 17 through the resistor 26. Simultaneously, a biasing current flows from the terminal 19 of the transformer secondary winding 17 through the diode 29, regulator network 21, resistor 22 and thence through the meter 11 and output resistor 36 to the center tap on the secondary winding 17. It will be noted that the signal and biasing currents do not change direction through the output circuit during alternate half cycles of operation. That is to say, unidirectional signal current pulses, of twice the frequency of the output from the generator 10, flow through the output circuit in one direction, while unidirectional biasing current pulses which are also twice the frequency of the generator output simultaneously flow through the output circuit in the opposite direction during operation of the frequency transducer. It will be apparent that the meter 11 in the output circuit is subject to the difference of the reference and signal currents simultaneously flowing therethrough, and not to the full amplitude of the individual reference and signal currents as in some prior art arrangements. Problems of mechanical vibration of the instrument pointer, are thereby minimized by such an arrangement wherein the energy at the output is at twice the frequency of the input, and the output comprises the difference between the reference and signal currents flowing simultaneously therethrough.

From the above description, and upon examination of the drawings, it will be apparent that the function of the rectifier networks 20 and 24 is, in effect, to select from the saturable core transformer secondary winding the positive pulses from one-half of the said secondary winding and pass the same to the reference current circuit, while passing the negative pulses from the other one-half of the transformer secondary winding to the signal current circuit. The positive pulses for the reference current circuit are obtained first from one-half of the transformer secondary winding during one-half cycle of operation and then from the other winding half during the other one-half cycle. The negative pulses for the signal current circuit are simultaneously obtained each half cycle of operation from the opposite transformer halves. In this manner, the identical transformer halves are alternately switched from the reference current circuit to the signal current circut, with both halves of the transformer secondary winding providing an input to the respective reference and signal current circuits over the course of each operating cycle. With the arrangement, the repetition rate of the pulses to both the reference current circuit and signal current circuit is twice the frequency of the input signal. For this reason, the transducer of my invention may be operated at low frequencies, where many prior art arrangements fail to function properly.

It will be apparent that the circuit elements may be chosen of such value that the resultant output current is zero at any particular frequency, say, 60 cycles per second. At this point, the biasing current pulses would equal the signal current pulses. As the frequency increased, the biasing current pulses would remain constant while the signal current pulses increased to thereby deflect the pointer of the instrument 12. With such an arrangement, the instrument would have a normal zero position at one end of the scale. It will be apparent that an instrument having a normal zero position at the scale center could be employed, whereby the instrument would indicate deviation of frequency in either direction from the frequency which provided a zero output current. Also, as mentioned above, the instrument may be calibrated in any desired scale units.

It is well known that the output from a transformer, such as the transformer 14, is dependent upon the transformer temperature. That is, as the temperature of the transformer windings, which are generally of copper wire, increases the resistance thereof also increases and the output therefrom decreases. Further, the magnetic properties of the transformer change with temperature in such a manner that the flux produced therein decreases with temperature. Without temperature compensating means in the circuit, it will be apparent that the signal current pulses would decrease while the biasing current pulses would remain constant due to the regulating effects of the Zener diode 33. To offset, or counteract, the temperature effects on the transformer 14, I include a copper, wire wound resistance element 22' in series with the reference current regulating resistor 22. The resistance of the copper resistor 22' increases linearly with temperature. Thus, as the compensating resistance element 22' becomes hotter during operation thereof, the resistance thereof increases to thereby reduce the biasing current through the resistor 22, meter 11, and load resistor 36. Since the meter responds to the difference in the biasing current and signal current, an equal decrease in both of the said currents will result in no deflection of the meter. Thus, the resistor 22' is selected which produces substantially the same change in the biasing current as the change in signal current pulses as a result of a temperature change of such elements. It will be apparent that the use of a copper wire wound, temperature dependent, resistor 22 in the circuit is a simple and economical method of compensating for temperature changes, as compared, for example, to the use of thermistors, or the like, in the circuit.

Having now described my invention in detail, in accordance with the requirements of the patent statutes, various changes and modifications will suggest themselves to those skilled in this art, and it is intended that such changes and modifications shall fall within the spirit and scope of the invention as recited in the following claims.

I claim:

1. A frequency transducer having an output related to the frequency of an input signal and comprising a saturable core transformer and an output circuit, first means including said transformer for obtaining a unidirectional biasing current of constant magnitude, second means including said transformer for obtaining unidirectional signal current pulses which vary in amplitude in accordance with the frequency of an input signal to the transformer, the said unidirectional biasing current and the signal current pulses simultaneously flowing in the output circuit in opposition to each other and each having a frequency which is twice the frequency of the input signal, thereby to provide current pulses in said output circuit having an amplitude that is proportional to the frequency of said input signal.

2. A frequency transducer having an input related to the frequency of an input signal and comprising first and second resistance elements connected together; a saturable core transformer having a primary winding and a center-tapped secondary winding; means connecting the said primary winding to an energizing source the frequency of which is to be measured; an output circuit connected between the junction between the first and second resistance elements and the center tap on the transformer secondary winding; a regulator network; means, including the regulator network, connecting the first resistance element to the end terminals of the transformer secondary winding whereby the current through the said first resistance element comprises a unidirectional reference current of substantially constant magnitude; and means connecting the second resistance element to the end terminals of the transformer secondary winding whereby the current through the second resistance element comprises a unidirectional signal current having an amplitude which varies in accordance with the frequency of the energizing source connected to the transformer primary winding, the unidirectional reference and signal currents flowing simultaneously in opposite directions through the said output circuit, thereby to provide a net output current in said output circuit having an amplitude and polarity that is proportional to the frequency of said input signal.

3. The invention as recited in claim 2 wherein the said means connecting the first resistance element to the said terminals of the transformer secondary winding includes a rectifying diode network including a pair of diodes having a pair of like electrodes connected together and to the input of the regulating network, the other like electrodes of the pair of diodes being connected to opposite ends of the transformer secondary winding; and the said means connecting the second resistance element to the end terminals of the transformer secondary winding includes a rectifying diode network including a pair of diodes having a pair of like electrodes connected together and to the said second resistance element, the other like electrodes of the pair of diodes being connected to opposite ends of the transformer secondary winding.

4. The invention as recited in claim 3 wherein the regulator network includes a shunt connected Zener diode.

5. The invention as recited in claim 3 including a copper, wire wound, temperature compensating resistor in series circuit with the said first resistance element.

6. A frequency transducer having an output related to the frequency of an input signal and comprising a saturable core transformer having a primary winding and a center-tapped secondary winding, the said primary winding being adapted for connection to an input signal the frequency of which is to be measured, a regulator network, a first rectifying diode network including a pair of diodes, means connecting the ends of the transformer secondary winding through individual diodes of the said first rectifying diode network to the said regulator network whereby unidirectional pulses of twice the input signal frequency are supplied to the said regulator network, first and second connected resistance elements, means connecting the regulator output of substantially constant voltage unidirectional biasing current to the said first resistance element, a second rectifying diode network including a pair of diodes, means connecting the ends of the transformer secondary winding through individual diodes of the said second rectifying diode network to the said second resistance element whereby unidirectional signal current pulses of twice the input signal frequencies and varying in magnitude in accordance with the frequency of the input signal are supplied to the said second resistance element, and an output circuit connected between the junction between the said first and second resistance elements and the center tap on the said secondary winding, the said unidirectional biasing current and signal current pulses flowing simultaneously in opposite directions through the said output circuit.

7. The invention as recited in claim 6 wherein the said regulator network includes a shunt-connected Zener diode.

8. The invention as recited in claim 6 including a copper, wire wound, compensating resistance element in series circuit with the first resistance element, the said compensating resistance element compensating for changes in amplitude of the signal current pulses due to temperature changes of the said transformer by reducing the magnitude of reference current with increasing temperature of the compensating resistor.

References Cited in the file of this patent

UNITED STATES PATENTS

| | | |
|---|---|---|
| 2,299,942 | Trevor | Oct. 27, 1942 |
| 2,431,994 | Dibrell et al. | Dec. 2, 1947 |
| 2,713,140 | Bixby | July 12, 1955 |

FOREIGN PATENTS

| | | |
|---|---|---|
| 1,047,847 | Germany | Dec. 31, 1958 |